United States Patent
Toriumi et al.

(10) Patent No.: US 7,056,219 B2
(45) Date of Patent: Jun. 6, 2006

(54) CONSTANT VELOCITY JOINT BOOT

(75) Inventors: Mayuki Toriumi, Aichi (JP); Yuji Furuta, Aichi (JP); Yoshikazu Mori, Aichi (JP)

(73) Assignee: Toyota Gosei Co., Ltd., Aichi-ken (JP)

( * ) Notice: Subject to any disclaimer, the term of this patent is extended or adjusted under 35 U.S.C. 154(b) by 183 days.

(21) Appl. No.: 10/682,888

(22) Filed: Oct. 14, 2003

(65) Prior Publication Data

US 2004/0116193 A1 Jun. 17, 2004

(30) Foreign Application Priority Data

Oct. 18, 2002 (JP) .......................... P2002-304099

(51) Int. Cl.
*F16C 1/26* (2006.01)
*F16D 3/84* (2006.01)
*F16J 3/04* (2006.01)

(52) U.S. Cl. ........................ 464/175; 277/636; 277/637
(58) Field of Classification Search ................ 464/175, 464/173, 111; 277/634, 636, 637
See application file for complete search history.

(56) References Cited

U.S. PATENT DOCUMENTS

| | | | |
|---|---|---|---|
| 6,695,706 B1 * | 2/2004 | Furuta | 464/175 |
| 6,832,763 B1 * | 12/2004 | Huchet et al. | 277/634 |
| 2004/0036231 A1 * | 2/2004 | Neviani | 277/634 |
| 2005/0026706 A1 * | 2/2005 | Kashiwagi et al. | 464/175 |

FOREIGN PATENT DOCUMENTS

| | | |
|---|---|---|
| DE | 198 06 173 C 1 | 9/1999 |
| DE | 101 31 302 A1 | 1/2003 |
| EP | 0915264 A2 | 5/1999 |
| EP | 1182372 A2 | 2/2002 |
| JP | A-10-110738 | 4/1998 |
| JP | A-H11-130952 | 5/1999 |
| JP | A-2002-013546 | 1/2002 |
| JP | A-2002-122237 | 4/2002 |

* cited by examiner

*Primary Examiner*—Kenneth Thompson
(74) *Attorney, Agent, or Firm*—Posz Law Group, PLC

(57) ABSTRACT

In a boot including a larger cylindrical portion having a thick-walled portion and a thin-walled portion continuing smoothly in the circumferential direction on the inner peripheral surface, a ring groove coming full circle on the outer peripheral surface of the larger cylindrical portion is formed.

Since shrinkage at the thick-walled portion can be prevented by the ring groove, and the ring groove is formed smoothly over the entire thick-walled portion and the thin-walled portion, there exists no varying point at which a stress generated when fastening with a fastening member suddenly changes.

4 Claims, 3 Drawing Sheets

CONSTANT VELOCITY JOINT BOOT

The present application is based on Japanese Patent Application No. 2002-304099, the entire contents of which are incorporated herein by reference.

BACKGROUND OF THE INVENTION

1. Field of the Invention

The present invention relates to a boot covered by a constant velocity joint that is indispensable for a joint for a drive shaft of a front-wheel-drive vehicle for protecting a joint portion of the constant velocity joint from invasion of water or dust.

2. Related Art

Hitherto, a joint portion of a constant velocity joint is covered by an accordion-folded boot and thus smooth rotation thereof at large angle is maintained by preventing invasion of water or dust. The constant velocity joint boot is constructed of a larger cylindrical portion of a large diameter to be held by a mating member such as a joint outer lace, a smaller cylindrical portion of a smaller diameter than the larger cylindrical portion held by a shaft, and a bellows portion in the shape of substantially truncated cone for integrally connecting the larger cylindrical portion and the smaller cylindrical portion. When in use, since the bellows portion is deformed in accordance with variations in angle formed between the mating member and the shaft, even when an operating angle increases, the joint portion can be reliably sealed by the boot.

The outer peripheral surface of the joint outer lace and the like as mating member is not only circular in cross section, but may have a non-circular cross section. When fastened by such a mating member, it is necessary to form the inner peripheral surface of the larger cylindrical portion of the boot into a non-circular shape corresponding to the outer peripheral surface of the mating member. However, the cross-section of the outer peripheral surface of the larger cylindrical portion is a circular form because it must be a fastened by a ring-shaped fastening member. Therefore, the larger cylindrical portion must consequently be formed with a thick-walled portion and a thin-walled portion.

It is convenient to manufacture the boot by blow molding. However, it is difficult to form the larger cylindrical portion constituting of the thick-walled portion and the thin-walled portion by blow molding. Therefore, forming the larger cylindrical portion into a bilayer structure, a process of forming an upper layer on the outer peripheral side with the bellows portion by blow molding, and integrating them by inserting a bush formed separately by injection molding into the upper layer is performed. However, in this case, two forming processes are required, which is disadvantageous in that a large number of processes are required.

Therefore, in recent years, a process of integrally forming the larger cylindrical portion constructed of the thick-walled portion and the thin-walled portion, the bellows portion and the smaller cylindrical portion by injection blow molding is performed. However, when forming the larger cylindrical portion constructed of the thick-walled portion and the thin-walled portion by injection molding, there may be the case in which surface sink is generated at the thick-walled portion after molding, and consequently, a gap is formed with respect to the mating member when fastened. Consequently, it may result in a defective good, which may lead to leakage of grease.

In order to improve such defect, it is effective to form the thick-walled portion into a hollow shape, and reduce the solid portion. Therefore, for example, in EP 0915 264 A2, there is disclosed a boot having a plurality of ribs on the larger cylindrical portion in the direction of thickness and a thick-walled portion being hollow at portions between the ribs. However, in the boot of this kind, there is a problem in that the strength of the rib is tend to be insufficient, and thus sealing property required for deforming the ribs when being fasten by the fastening member cannot be obtained.

In addition in JP-10-110738, a boot having a larger cylindrical portion formed with a slit at the end surface of the thick-walled portion is disclosed. However, in the boot of this kind, since the thick-walled portion is deformed so that the width of the slit is narrowed when being fastened by the fastening member and thus defection is constantly generated, further deflection may occur due to bending of the bellows portion when in use, and thus it may suffer some cracks. There is also a case in which a gap is generated between the wall surface on both sides of the slit. In such a case, an uniform fastening force cannot be obtained and thus required sealing property cannot be obtained.

In JP-A-2002-122237, a boot formed with a slit opening at the outer peripheral surface of the thick-walled portion of the larger cylindrical portion is disclosed. However, in this boot, there is a problem in that stress varying points are generated at both ends of the slit when fastened by the fastening member and thus uniform fastening force cannot be obtained, whereby required sealing property cannot be achieved.

SUMMARY OF THE INVENTION

In view of such circumstances, an object of the present invention is to provide a boot in which shrinkage is prevented from being generated at the thick-walled portion of the larger cylindrical portion and uniform fastening is achieved when fastened by the fastening member so that required sealing property can be achieved.

Having solved the problems described above, a constant velocity joint boot according to the present invention includes a larger cylindrical portion, a smaller cylindrical portion having a smaller diameter than the larger cylindrical portion, the small cylindrical portion being disposed away from and coaxial with the larger cylindrical portion, the smaller cylindrical portion being held by a shaft, and an according-folded portion of substantially truncated conical shape for integrally connecting the larger cylindrical portion and the smaller cylindrical portion, characterized in that the larger cylindrical portion has an inner peripheral surface corresponding to the portion of noncircular shape in cross section of a mating member and a cylindrical outer peripheral surface, the outer peripheral surface includes a fastening face to which a ring-shaped fastening member is fastened, the inner peripheral surface is formed with a thick-walled portion and a thin-walled portion continuing smoothly in the circumferential direction, and the outer peripheral surface of the larger cylindrical portion is formed with a ring groove coming full circle of the outer peripheral surface and opening at the fastening face.

Preferably, the larger cylindrical portion comprises an endless lip member coming full circle around the inner peripheral surface for being press contact with the mating member, and the ring groove is formed at the position shifted from the position opposing the backside of the lip member.

Preferably, the thickness at a bottom of the ring groove at the thick-walled portion is substantially the same as the thickness of the thin-walled portion other than the ring groove.

In a boot according to the present invention, a larger cylindrical portion is formed on an outer peripheral surface thereof with a ring groove coming full circle of the outer peripheral surface and opening at a fastening face. Accordingly, since a solid portion of a thick-walled portion is reduced, and thus shrinkage when performing injection molding can be prevented.

Since the ring groove is formed entirely on the thick-walled portion and the thin-walled portion, no stress varying points where the stress suddenly varies when fastened by a fastening member exist, and thus uniform fastening is achieved. Therefore, required sealing property can be established, and the problem in that a gap is formed with respect to a mating member may be prevented.

In many cases, the larger cylindrical portion is formed with an endless lip member coming full circle around the inner peripheral surface for being brought into press contact with the mating member for increasing the contact pressure with the mating member and thus increasing the sealing property. In this case, when the ring groove is formed at a position opposing the backside of the lip member, a fastening force by the fastening member cannot be transmitted to the lip member sufficiently, and thus the sealing property may be deteriorated. Therefore, when the lip member is formed on the inner peripheral surface of the larger cylindrical portion, preferably, the ring groove is provided at a position shifted from the position opposing the backside of the lip member. In this arrangement, since the backside of the lip member is solid, the fastening force of the fastening member is sufficiently transmitted and thus the problem in that the sealing property is lowered may be prevented.

The number of the lip member is not specifically limited. For example, when one lip member is provided, two ring grooves in parallel with the lip member can be formed at positions corresponding to both sides of the lip member in the direction of the axis of the larger cylindrical portion. Alternatively, when two parallel lip members are provided, a ring groove may be formed at a position corresponding to a portion between the two lip members. In this case, further ring grooves maybe formed at positions sandwiching the two lip members respectively.

The capacity of the ring groove may simply be such extent that no shrinkage is generated at the thick-walled portion without running therethrough, the number, width, or depth are not specifically limited. In addition, when forming one ring groove at the position corresponding to the portion between two parallel lip members, it is desirable to make the ratio of the width of the ring groove with respect to the distance between two lip members be 0.3 to 0.5 both for the thick-walled portion and the thin-walled portion. When the ratio is smaller than 0.3, it is difficult to prevent generation of shrinkage, and when it is larger than 0.5, undesirable deformation occurs when fastened, which may result in sealing property at the lip member.

It is also possible to vary the width and the depth of the ring groove between the thick-walled portion and the thin-walled portion. However, it is necessary to make the bottom surface continue smoothly in the circumferential direction so that no stress varying points are generated when fastened.

Preferably, the thickness of the bottom of the ring groove at the thick-walled portion is substantially the same as the thickness of the thin-walled portion other than the ring groove. Accordingly, fastening force of the fastening member can further be made uniform around the entire circumference and thus sealing property is further improved.

The constant velocity joint boot according to the present invention may be formed of thermoplastic elastomer, such as TPE, TPO and the like. Preferably, at least the bellows portion includes a compound having a hydrophilic nature and being low in coefficient of friction, and the compound is formed of thermoplastic elastomer that can exude to the surface. By employing a resin of this type, the blended compound exudes to the surface of the bellows portion. Therefore, water on the surface is prevented from being completely removed due to contact surface pressure at peaks exerted from each other, and thus water always exists all over, whereby generation of abnormal sound with the interposition of water is restrained.

The most desirable thermal plastic elastomer is the thermal plastic polyester elastomer disclosed in JP-A-11-130952. When the thermal plastic polyester elastomer is used, at least one type of blended polyether and non-degeneration polyolefin exudes to the surface. Since they have a hydrophilic property, generation of abnormal noise with the interposition of water is restrained.

The constant velocity joint boot according to the present invention uses the above-described thermal plastic elastomer as a material and thus may be formed by injection blow molding. In other words, a cylindrical body having the larger cylindrical portion and the smaller cylindrical portion at both ends by injection molding is formed, and then the bellows portion is formed by blow molding with the cylindrical body placed in the blow molding die. Since the ring groove is formed during molding by a ring-shaped projecting ridge formed on the die surface of the mold used for the large cylindrical portion. Therefore, increase in the number of steps is prevented.

DETAILED DESCRIPTION OF THE PREFERRED EMBODIMENTS

The present invention will be described in detail below based on an experimental example.

Figure 1:
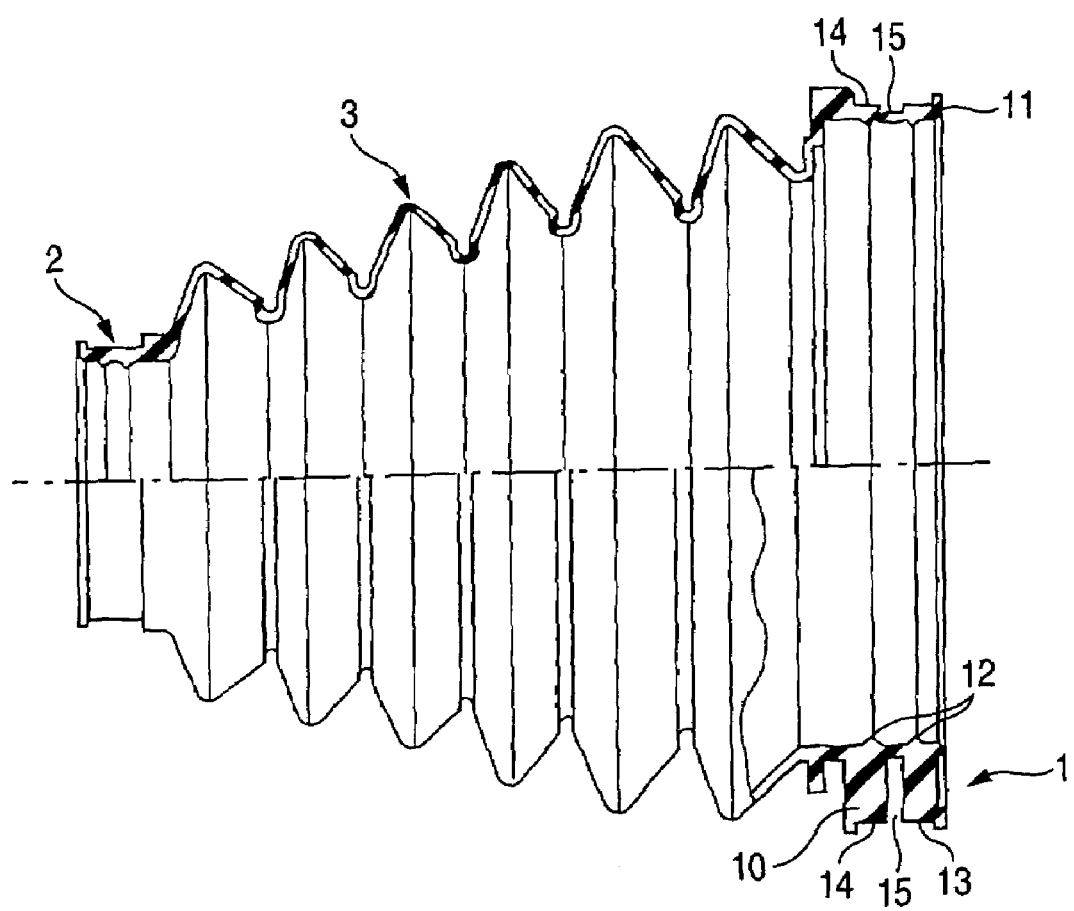
FIG. 1 is a front view of a constant velocity joint boot showing a cross section of the half body thereof according to the embodiment.
Figure 2:
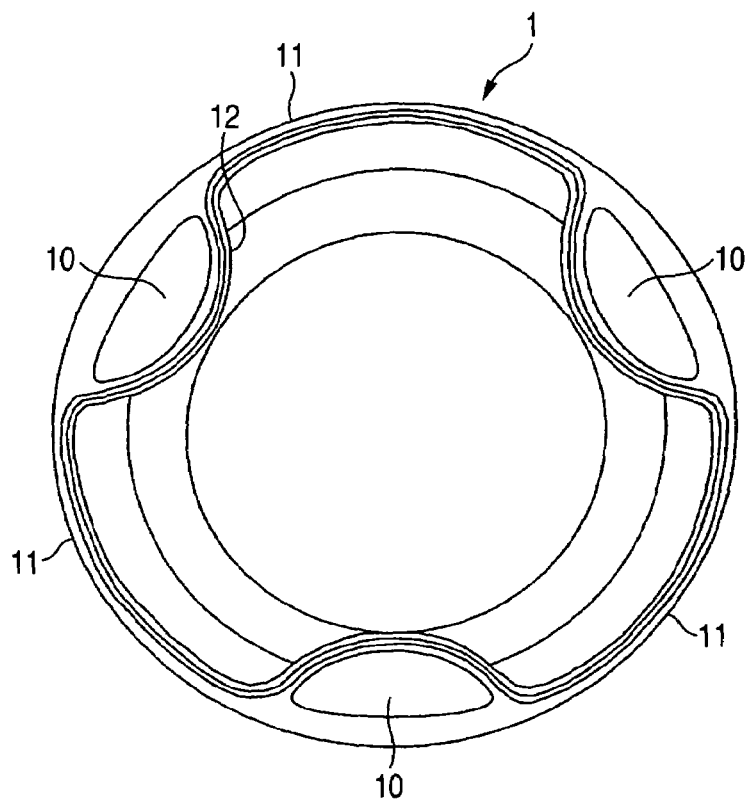
FIG. 2 is a side view of FIG. 1 viewed from the side of a larger cylindrical portion of the constant velocity joint boot according to the embodiment.

FIG. 1 is a front view of a constant velocity joint boot according to the present invention showing a cross section of the half body thereof, and FIG. 2 is a side view of FIG. 1 viewed from the side of the larger cylindrical portion. The constant velocity joint boot is constructed of a larger cylindrical portion 1, a smaller cylindrical portion 2 having a smaller diameter than the larger cylindrical portion 1, and a bellows portion 3 of substantially truncated conical shape for integrally connecting the larger cylindrical portion 1 and the smaller cylindrical portion 2. The bellows portion 3 is formed of thermoplastic elastomer by blow molding, and the larger cylindrical portion 1 and the smaller cylindrical portion 2 are formed of thermoplastic elastomer integrally with the bellows portion 3 by injection molding.

Figure 6:
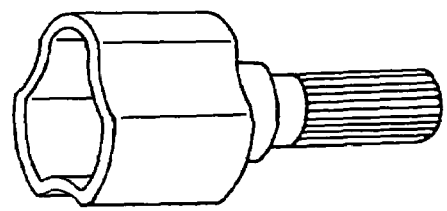
FIG. 6 is a perspective view showing a mating member to which the larger cylindrical portion is fastened.

In this boot, the larger cylindrical portion 1 is fastened to a mating member having a noncircular cross section as shown in FIG. 6 with a fastening member such as a clamp or a metal band. Therefore, an inner peripheral surface of the larger cylindrical portion 1 is formed into a noncircular shape which is analogous to the shape of the outer periphery of the mating member, and is formed with three thin-walled portions 11 each formed between the adjacent thick-walled portions 10, and the thick-walled portion 10 and the thin-walled portions 11 continue smoothly. Two endless lip members 12 coming full circle in the circumferential direction are formed in parallel at a distance from each other on the surface of the thick-walled portion 10 and the thin-walled portion 11. When fastened to the mating member, these two lip members 12 are brought into press contact with the outer peripheral surface of the mating member, and thus high sealing property is achieved.

On the other hand, the outer peripheral surface of the larger cylindrical portion 1 has a completely round shape, and is formed with a shallow groove 13 which the fastening member engages around the outer peripheral surface so as to come full circle. The bottom portion of the shallow groove 13 constitutes a ring-shaped fastening face 14. The bottom of the shallow groove 13 is formed with a ring groove 15 opened at the fastening face 14 so as to come full circle.

Figure 3:
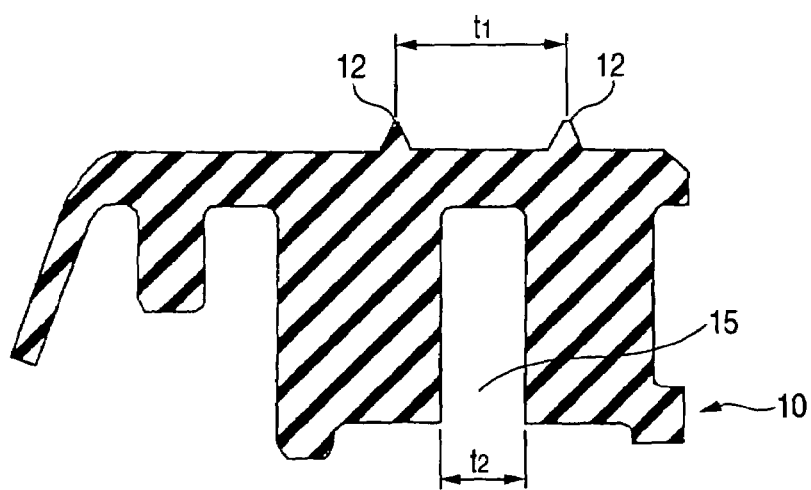
FIG. 3 is an enlarged cross-sectional view of a thick-walled portion of the constant velocity joint boot according to the embodiment.
Figure 4:
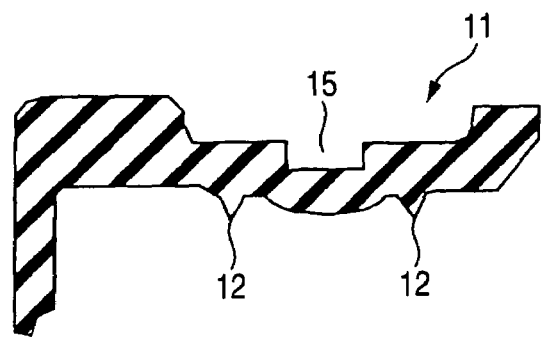
FIG. 4 is an enlarged cross-sectional view of a thin-walled portion of the constant velocity joint boot according to the embodiment.

FIG. 3 is an enlarged cross-sectional view of the thick-walled portion 10, and FIG. 4 is an enlarged cross-sectional view of the thin-walled portion 11. The width of the ring groove 15 is circumferentially constant, and the depth of the ring groove 15 is deep at the thick-walled portion 10 and shallow at the thin-walled portion 11 as shown in FIGS. 3 and 4. The bottom surface continues into a smooth curved line. The thickness of the ring groove 15 at the thick-walled portion 10 is substantially the same as the thickness of the thin-walled portion 11.

The ring groove 15 is disposed at the position corresponding to the intermediate portion of the two lip members 12 at the position shifted from the portion opposing the backside of the lip members 12. The ratio (t2/t1) of the width (t2) of the ring groove 15 with respect to the distance (t1) between two lip members 12 is 0.4 both for the thick-walled portion 10 and the thin-walled portion 11.

Therefore, since the capacity occupied by the ring groove 15 in the thick-walled portion 10 is relatively large, shrinkage is prevented from being generated at the thick-walled portion 10 during molding. Since a large quantity of the solid sick portion 10 exists on the backside of the two lip members 12, fastening force generated when fastened by the fastening member is positively transmitted to the two lip members 12, and thus high sealing property is achieved.

The boot according to this embodiment was fastened with a jig of the same shape as the meting member inserted into the larger cylindrical portion 1 and a metal band engaged in the shallow groove 13 at a predetermined force. Then it was soaked into water, a pressurized air is introduced from the side of the small cylindrical portion 2, and the air pressure at which air is leaked from between the larger cylindrical portion 1 and the mating member (air leakage pressure) was measured. The boot having the same configuration but having no ring groove 15 was used as an example of the related art, and the air leakage pressure is measured in the same manner. The results are shown in FIG. 5.

Figure 5:
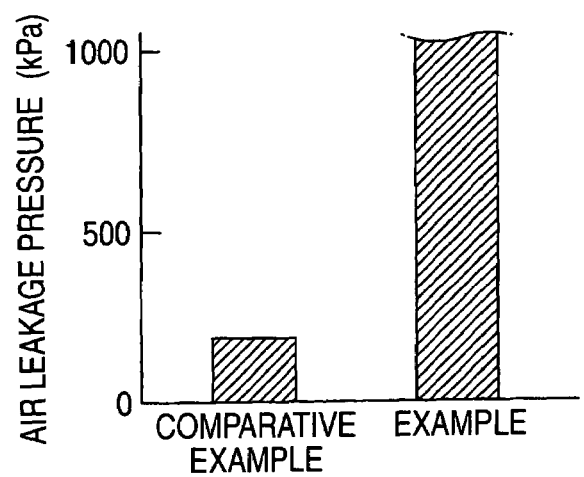
FIG. 5 is a graph showing air leakage pressures of constant velocity joint boots according to the embodiment and the related art.

From FIG. 5, it was proved that air leakage occurred at an air pressure of 200 kPa with the boot in the related art (COMPARATIVE EXAMPLE), while air leakage did not occur even at an air pressure of 980 kPa for the boot according to the present embodiment (EXAMPLE). It is obviously an effect of formation of the ring groove 15. In the case of the boot according to the embodiment, no shrinkage is generated at the thick-walled portion. In addition, since it could be fastened uniformly, it was considered that sealing property was improved.

In other words, according to the constant velocity joint boot according to the present invention, generation of shrinkage at the thick-walled portion during molding is prevented, and the larger cylindrical portion is fastened to the mating member with a uniform fastening force. Therefore, sealing property is improved, and generation of cracks due to deflection may be prevented.

What is claimed is:

1. A constant velocity joint boot comprising:
   a larger cylindrical portion;
   a smaller cylindrical portion held by a shaft coaxially with the larger cylindrical portion and being smaller in diameter than the larger cylindrical portion, and
   a conical bellows portion for connecting the smaller cylindrical portion and the larger cylindrical portion integrally with respect to each other;
   wherein the larger cylindrical portion includes:
      an inner peripheral surface for being fitted to a mating member having a noncircular cross-section, provided with a thick-walled portion and a thin-walled portion continuing in a circumferential direction of the larger cylindrical portion, and
      an outer peripheral surface having a circular cross-section, provided with a fastening face to which a ring-shaped fastening member is fastened, wherein the fastening face is located at the bottom of a shallow groove,
      a ring groove coming full circle around the outer peripheral surface and opening at the fastening face, wherein the ring groove is formed beneath the fastening member, and
      at least one endless lip member coming full circle around the inner peripheral surface for being press contact with the mating member, and the ring groove is formed at a position shifted from a position opposing a backside of the lip member.

2. A constant velocity joint boot according to claim 1, wherein the constant velocity joint boot is formed of thermoplastic elastomer.

3. A constant velocity joint boot comprising:
   a larger cylindrical portion;
   a smaller cylindrical portion held by a shaft coaxially with the larger cylindrical portion and being smaller in diameter than the larger cylindrical portion, and
   a conical bellows portion for connecting the smaller cylindrical portion and the larger cylindrical portion integrally with respect to each other;
   wherein the larger cylindrical portion includes;
      an inner peripheral surface for being fitted to a mating member having a noncircular cross-section, provided with a thick-walled portion and a thin-walled portion continuing in a circumferential direction of the larger cylindrical portion, and
      an outer peripheral surface having a circular cross-section, provided with a fastening face to which a ring-shaped fastening member is fastened, and
      a ring groove coming full circle around the outer peripheral surface and opening at the fastening face, at least one endless lip member coming full circle around the inner peripheral surface for being press contact with the mating member, and the ring groove is formed at a position shifted from a position opposing a backside of the lip member, and wherein the lip member is one of two adjacent lip members, and a ratio of a width of the ring groove with respect to a distance between the two adjacent lip members is 0.3 to 0.5 both for the thick-walled portion and the thin-walled portion.

4. A constant velocity joint boot comprising:

a larger cylindrical portion;

a smaller cylindrical portion held by a shaft coaxially with the larger cylindrical portion and being smaller in diameter than the larger cylindrical portion, and a conical bellows portion for connecting the smaller cylindrical portion and the larger cylindrical portion integrally with respect to each other;

wherein the larger cylindrical portion includes:

an inner peripheral surface for being fitted to a mating member having a noncircular cross-section, provided with a thick-walled portion and a thin-walled portion continuing in a circumferential direction of the larger cylindrical portion, and an outer peripheral surface having a circular cross-section, provided with a fastening face to which a ring-shaped fastening member is fastened, and a ring groove coming full circle around the outer peripheral surface and opening at the fastening face, wherein a thickness of a bottom portion of the ring groove at the thick-walled portion is substantially the same as the thickness of the thin-walled portion.

* * * * *